United States Patent [19]
Nelson

[11] 3,729,252
[45] Apr. 24, 1973

[54] OPTICAL SPATIAL FILTERING WITH MULTIPLE LIGHT SOURCES

[75] Inventor: Clarence N. Nelson, Rochester, N.Y.

[73] Assignee: Eastman Kodak Company, Rochester, N.Y.

[22] Filed: June 5, 1970

[21] Appl. No.: 43,870

[52] U.S. Cl. ............ 350/162 SF, 350/96 B, 350/317
[51] Int. Cl. ............................................. G02b 27/38
[58] Field of Search ................................ 350/162 SF

[56] References Cited

UNITED STATES PATENTS

| | | | |
|---|---|---|---|
| 3,504,606 | 4/1970 | Macovski | 350/162 SF X |
| 3,470,310 | 9/1969 | Shashua | 350/162 SF UX |
| 3,488,190 | 1/1970 | Smith | 350/162 SF UX |
| 3,549,238 | 12/1970 | Graser, Jr. | 350/162 SF |
| 3,556,639 | 1/1971 | Graser, Jr. | 350/162 SF |
| 3,572,900 | 3/1971 | Bouche | 350/162 SF |
| 3,546,374 | 12/1970 | Graser, Jr. | 350/162 SF X |
| 2,995,067 | 8/1961 | Glenn, Jr. | 350/162 SF UX |
| 3,409,872 | 11/1968 | Hogg et al. | 350/162 SF UX |

FOREIGN PATENTS OR APPLICATIONS

| 11,466 | 1899 | Great Britain | 350/162 SF |
|---|---|---|---|

Primary Examiner—John K. Corbin
Attorney—W. H. J. Kline; P. R. Holmes and L. F. Seebach

[57] ABSTRACT

An optical system in which a plurality of light sources is used in conjunction with a spatial filter to modify at least some of the details of a projected image so as to increase or decrease the image contrast with respect to such details.

16 Claims, 7 Drawing Figures

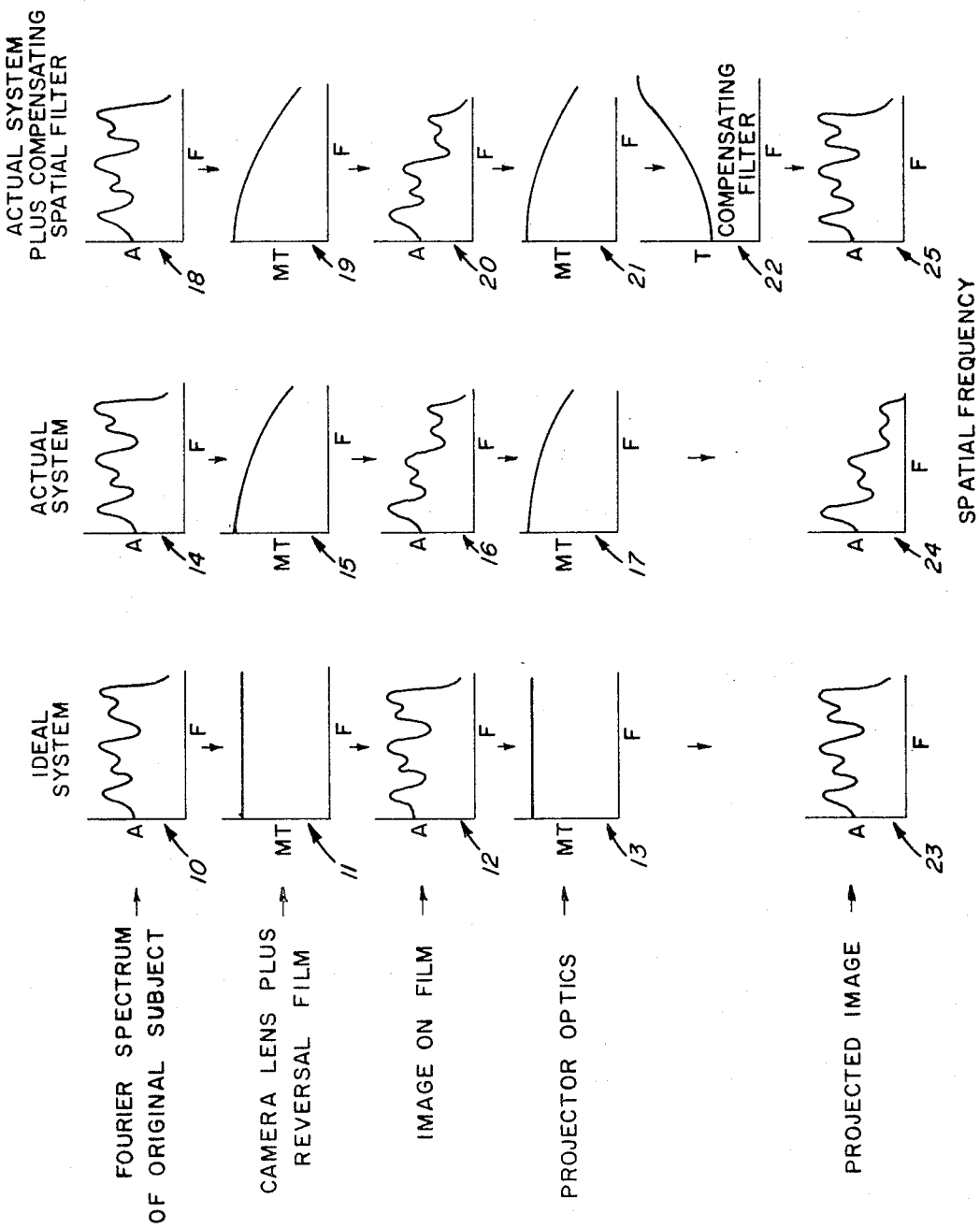

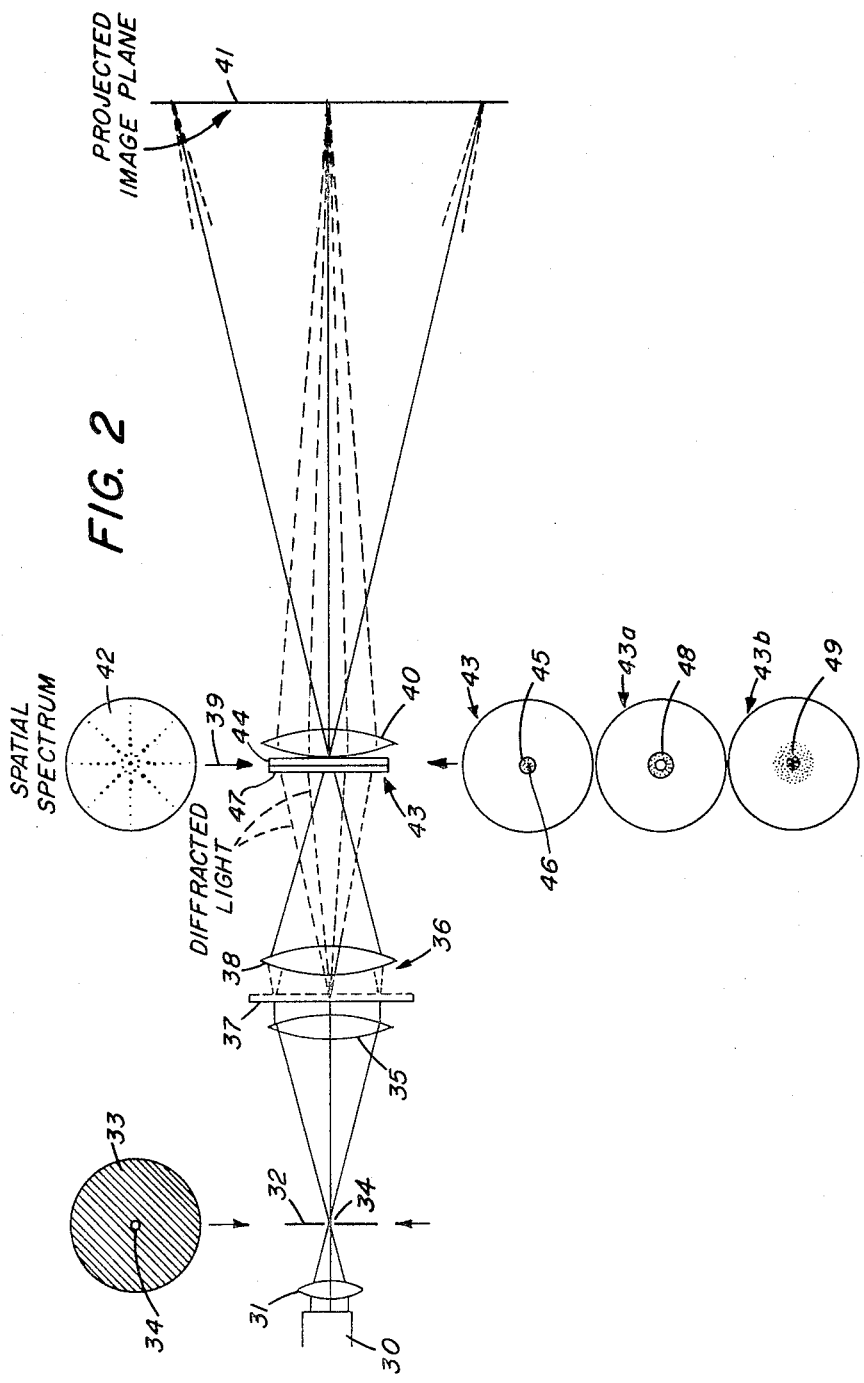

CLARENCE N. NELSON
INVENTOR.

BY [signature]

AGENT

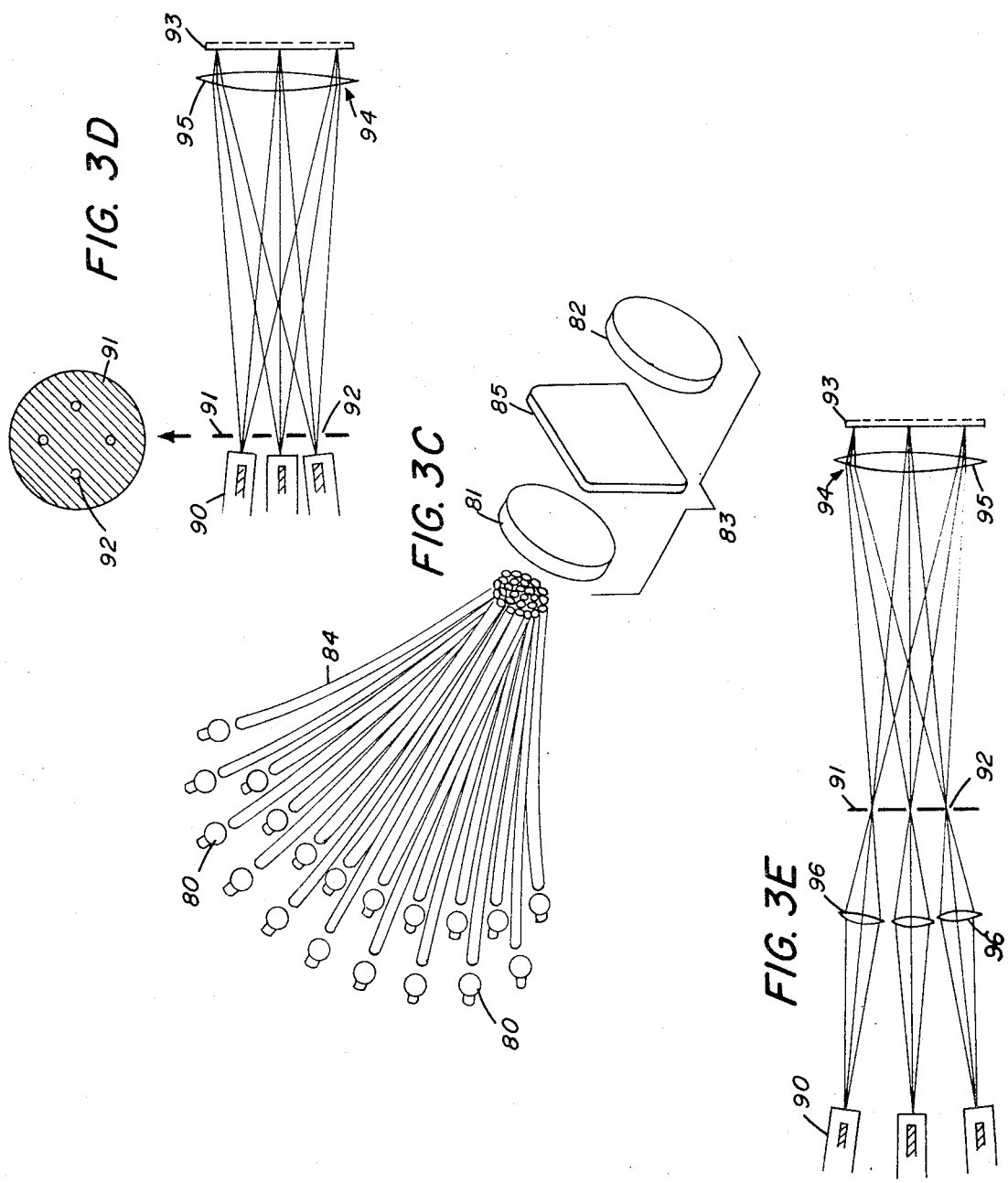

OPTICAL SPATIAL FILTERING WITH MULTIPLE LIGHT SOURCES

FIELD OF THE INVENTION

This invention relates to optical spatial filtering and, more particularly, to an optical system in which a plurality of light sources is used in conjunction with a spatial filter to modify at least some of the details of a projected image so as to increase or decrease the image contrast with respect to such details.

DESCRIPTION OF THE PRIOR ART

The principles of optical spatial filtering are deducible from the wave theory of light. In practice, a variety of changes can be made in the clarity, resolution, and appearance of the details in an optical image by modifying (filtering) the amplitude or phase of the light in a variety of regions of the specimen's diffraction spectrum. The latter is produced most accurately if the light source has a small size in terms of its subtended angle. In phase contrast microscopy, a spatial filter is used that shifts the phase of the light in a particular region of the diffraction spectrum and thereby makes certain details become visible that would otherwise be invisible.

Maximum spatial-frequency discrimination is obtained in spatial filtering if the light is highly coherent both spatially and temporally. Light from a point source is highly coherent spatially, and monochromatic light is highly coherent temporally. Both types of coherence are useful in spatial filtering.

The advent of the laser stimulated widespread interest in optical spatial filtering because the laser, when used with a lens and a pinhole, provided, for the first time, means for obtaining a very close approximation of a point source of monochromatic light with more than adequate intensity. Thus, the laser offered high coherence and high intensity. The earlier light sources, when used with a lens, a pinhole and a color filter to achieve high coherence, gave very low intensities.

If an image-bearing medium is a photographic transparency bearing only a faithful image of a sine-wave grating, the spectrum consists of a central beam of light, representing the undeviated or "zero-order" image of the point source of light, flanked by two beams representing the "first-order" diffracted image of the point source. The lateral distance from the zero-order beam to either of the two first-order beams is proportional to the spatial frequency of the grating (in cycles per unit distance), the wavelength of the light, and the distance from the sample to the plane of the spectrum. Thus, for any given wavelength of the light, the information in the transparency is conveniently spread out according to spatial frequency in the diffraction (Fourier transform) plane.

When an image-bearing medium is a photographic transparency with typical pictorial subject matter and is placed in a nearly coherent beam of light passing through a condenser lens system of good optical quality, the diffraction spectrum comprises a large number of beams of light that pass through the spectrum plane. The characteristics of this spectrum are predictable from the spatial distribution of amplitude ($\sqrt{\text{intensity}}$) transmittance and phase in the image-bearing medium. The amplitude transmittance characteristics of the image-bearing medium can be resolved by Fourier analysis into its sine wave or cosine wave components, each of which has a certain spatial frequency, amplitude, azimuth orientation, and phase, Each point in the spectrum represents, for any given wavelength of light, a particular spatial frequency in the transparency. The intensity at each point in the spectrum is proportional to the square of the amplitude of the corresponding spatial frequency component of the transparency. The low frequency and edge sharpness information in the transparency is represented, in the diffraction plane, by points of light that lie at a greater distance from the zero-order beam than the points of light representing the high frequency information and the large-area contrast of the transparency.

The final image of the transparency, produced by the projection lens, can be thought of as the consequence of the superposition and interference (in the final image plane) of light originating in the various regions of the diffraction spectrum.

For the purpose of increasing the edge sharpness and fine-detail contrast of the projected image of a photographic transparency, a certain type of spatial filter can be inserted into the plane of the diffraction spectrum. Such a filter can comprise a clear, optically flat, glass plate bearing a light absorbing medium that in some preselected pattern (pattern of dots, variable density area, etc.) transmits a fraction (such as one-fourth in terms of intensity of one-half in terms of amplitude) of the light in the zero-frequency and low frequency regions but transmits progressively more freely in the medium and high-frequency regions. For example, a filter intended for suppression of all information except the letter A in a microfilm image is made so that it transmits only the spectrum of the letter A.

Spatial filtering can be done with either coherent or partially coherent light, but the spatial frequency discrimination is greatest when the light is highly coherent. If, in the particular application of interest, high discrimination is not required, the degree of coherence can be substantially reduced as a means of increasing the light intensity. The effective source is the illuminated pinhole, and, if the size of the pinhole is increased and/or the wavelength bandwidth of the light is increased, the spatial frequency discrimination can be reduced to the minimum required value. With partially coherent light, the spatial filtering is always gradual with respect to spatial frequency. Abrupt changes with respect to spatial frequency are possible only with highly coherent light, but the gradual type of filtering is satisfactory in many practical applications. A decrease in coherence is, with most sources, accompanied by a large increase in intensity, which can be an important practical advantage.

One of the major obstacles that hinders the use of spatial filtering in many practical applications, especially in photographic applications, is the existence of certain unwanted side effects or blemishes in the optical images produced. These blemishes are of several kinds or types. One type is due to the surface irregularities and relief images that often occur on the film, especially when the film is one that has been processed. This kind of blemish is minimized or eliminated by immersion of the film in a liquid having a refractive index approximately equal to that of the film. A second type of side effect that is often thought of as a blemish is the "fringing" or "ringing" generally found in coherent-light images of sharp edges and in certain other types of subject matter. This blemish can be minimized by reducing the degree of coherence of the light or by proper shaping of the amplitude transmittance versus distance function of the spatial filter.

A third type of blemish arises from the interaction of the coherent or partially coherent light with the dirt, dust, scratches, bubbles and other optical defects on (or in) the lenses, filters and other optical components in the system used for spatial filtering. It is the spatial coherence associated with the use of a single point (or semi-point) source that causes this type of blemish. The undirectional or nearly undirectional nature of the light from a point or semi-point source causes high-contrast, highly-visible shadows of the described foreign material and optical defects to be cast on the final image. These shadows greatly diminish the aesthetic quality of the final image and can also cause a localized loss of detail representing important technical information.

SUMMARY OF THE INVENTION

The object of the invention is to provide an optical system embodying optical spatial filtering that can be readily used in photographic apparatus to minimize certain kinds of image blemishes inherent in the images produced by conventional systems for optical spatial filtering.

The object of the invention is attained by the use of a plurality of point sources or (when the highest degree of coherence is not required) a plurality of semi-point sources in place of the single point source or semi-point source that is conventional in optical spatial filtering. The blemishes involved are the high-contrast shadows cast on the image (when the light source is a point or semi-point source) by the bubbles, scratches, local inhomogeneities, dirt, dust and other foreign matter existing on or in the lenses, filters or other optical elements in the optical system. When the plurality of point or semi-point sources is used with sufficient angular separation between sources, a dust particle on one of the lenses, for example, casts a plurality of shadows on the final image, but each shadow is in a different position on the image. The contrast of each shadow when four sources are used is then generally one-fourth, and when $n$ sources are used is generally one-$n^{th}$ of the contrast that is normally obtained when a single point or semi-point source is used. The blemish is thereby greatly reduced in contrast and becomes inconspicuous or even invisible. The blemish known as ringing or fringing is also substantially reduced by the use of a plurality of effective sources.

The effective source for conventional spatial filtering can be thought of as a properly illuminated pinhole, or hole of small diameter. The effective plurality of sources for the proposed system for spatial filtering can be thought of as an array of properly illuminated pinholes or holes of small diameter. These small-diameter effective sources can be illuminated by any convenient or appropriate light, monochromatic or polychromatic, from any of a variety of actual sources such as lasers, tungsten filament lamps, xenon arcs, zirconium concentrated arcs, etc. Thus for the proposed system, the actual source When the either a single lamp of a multiplicity of lamps, the light from which is passed through an array of apertures in an opaque plate to produce the desired multiplicity of small-diameter effective sources or light beams.

DESCRIPTION OF THE DRAWINGS

Reference is now made to the accompanying drawings wherein like reference numerals and characters designate like parts and wherein:

FIG. 1 is a graphical presentation of amplitude spatial filtering as applied to a photographic system and showing the relation between an ideal, actual and compensating system;

FIG. 2 is a schematic optical system showing a conventional spatial filtering system in which a laser and a pinhole are used to produce the single effective light source;

FIG. 3C is a partial schematic optical system in which a plurality of light pipes is used to transfer light to the multiple-aperture plate from a plurality of lamps in a system similar to that shown in FIG. 3A; and FIGS. 3D and 3E are partial schematic optical systems in which a plurality of zirconium arc lamps are used to illuminate the multiple-aperture plate in a system similar to that shown in FIG. 3A.

DESCRIPTION OF THE PREFERRED EMBODIMENTS

Figures 3A, 3B:
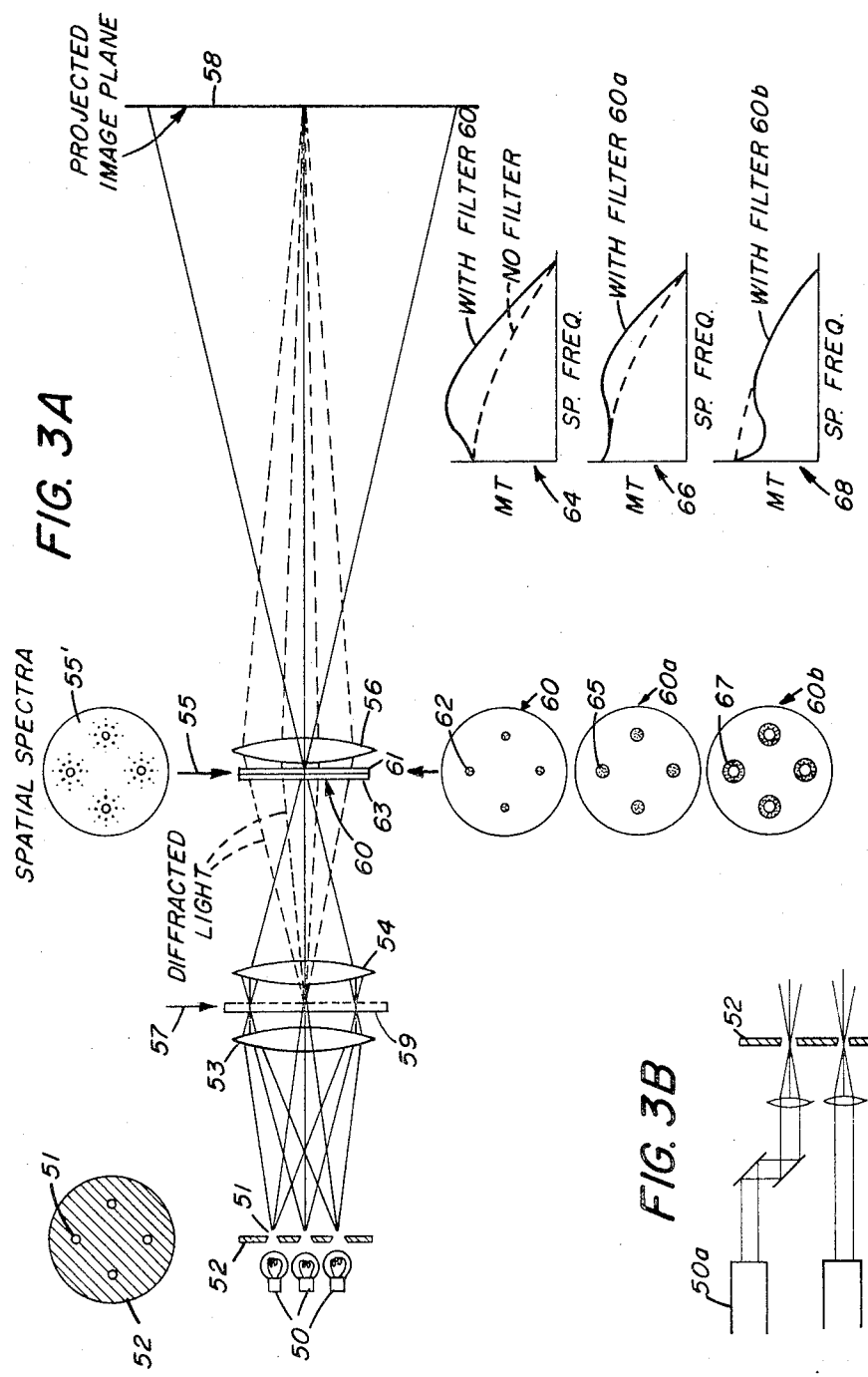
FIG. 3A is a schematic optical diagram showing one embodiment of the invention in which a plurality of lamps is used to illuminate an aperture plate containing more than one and preferably more than ten small apertures and showing the frequency response curves that are attained with different types of spatial filters.
FIG. 3B is a partial schematic optical system in which a plurality of lasers is used to illuminate the multiple-aperture plate in a system similar to that shown in FIG. 3A.

Before describing the invention in detail, a definition of some of the terms used hereinafter is deemed to be in order for a better understanding of the invention, such terms being set forth hereinbelow:

A *spatial filter* is defined as any means used to change, in the amplitude or phase, the light passing through the plane of the diffraction spectrum (also known as the Fourier transform plane) of the specified optical system, the diffraction spectrum being a multiple image of the point source and produced by diffraction of the light by an image-bearing medium.

An *amplitude medium* is one that alters amplitude transmittance (that is, in coherent illumination) with no substantial alternation of phase and a *phase medium* is one that alters phase transmittance with no substantial alternation of amplitude.

*Resolution* of a system is generally defined as the maximum spatial frequency that a particular system will transmit with detectable amplitude.

*Contrast* as applied to the image blemish associated with a dust shadow is defined as the ratio of the illuminance in the portion of the image immediately surrounding the shadow to the illuminance in the portion of the image plane that lies in the shadow.

*White light* is considered as any one of a variety of spectral energy distributions producing the same subjective color sensation as average daylight, sunlight, or light from a blackbody radiator at a temperature lying between 300 Kelvin and 7000 Kelvin.

*Monochromatic light* is light of a very narrow range of wavelengths, whereas, *polychromatic light* is light having two or more colors, or including a range of wavelengths.

With reference particularly to FIG. 1, if the Fourier components of a subject are derived by Fourier analysis and the spatial amplitude coefficients and spatial phase angles are plotted as a function of spatial frequency, F, an amplitude spectrum and a phase spectrum of the subject are obtained that are characteristic of that particular subject. The phase spectrum is sometimes zero or constant and the amplitude spectrum is then a sufficient characterization. Such a spectrum is represented by the graph 10 in FIG. 1. The camera lens, camera film and projector lens would, presumably, be ideal if they produced an image having a spatial amplitude spectrum exactly like that of the original subject. This ideal condition is represented by the graphs designated as 11, 12, 13 and 23, respectively. The modulation transfer (MT) functions indicate the fidelity with which the lens and film transfer these spatial amplitude through the system. The graphs 14, 15, 16 and 17 represent the actual conditions for which the scattering of light in the photographic emulsion and the aberations and diffraction in the lens images reduce the amplitude coefficients a progressively greater amount as the spatial frequency increases. The contrast of the fine detail in the final image, as denoted by graph 24, is therefore usually less than the contrast of the broad detail of the image. The graphs designated 18, 19, 20 and 21 show the effect that might be desired from the use of a spatial filter in an optical projector that produces the final image. The amplitude transmittance of the desired filter has a shape that represents compensation for the amplitude losses introduced by the photographic emulsion and the lenses. This is shown in the graph designated by the numeral 22. At higher frequencies, the losses introduced by the emulsion and the lenses can, of course, be so great that no significant improvements can be brought about by spatial filtering. The graphs 23, 24 and 25 illustrate the spectrum of the projected image under each of the three respective systems.

FIG. 2 discloses an optical system that utilizes spatial filtering in conjunction with a laser 30 as the light source. Coherent rays of light from the laser 30 are focused by lens 31 to a point in plane 32 in which a plate 33 having a very small aperture 34 is positioned. The aperture 34 permits only the light emanating therefrom to pass to lens 35 which is one of the lenses in a condenser lens system designated by the numeral 36. The light emanating from aperture 34 is therefore considered to be, effectively, emanating from a point source. A photographic film 37 in the form of a transparency (black and white, color, negative or positive) bearing an image is positioned between lens 35 and lens 38 which is in a region in the condenser lens system 36 in which the light rays are substantially parallel. The condenser lens system 36 effectively brings the image on film 37 to focus in a plane designated by numeral 39 which is the Fourier transform plane. The lens system 40 forms a real image of film 37 on an image-receiving plane 41 which can be a screen or a photosensitive material, such as photographic film, paper, plate, etc. If the film 37 were not present in the system, a single image of the point source in plane 32 would be found in the plane 39. Because of diffraction of the light by the image on the film, as indicated by the dotted lines, many images of the point source are found in plane 39. The film image acts like a grating in a spectrograph. The light distribution in plane 39 is the spatial spectrum (Fourier transform) of the image on the film. The square root of the intensity of light at each point in plane 39 is proportional to the coefficient of amplitude for a particular frequency in the Fourier series representing the film image. As a result, the information contained in the film image is, by diffraction, spread out in the plane 39 according to spatial frequency. The low frequency source of the spectrum lies near the center and close to the zero-order image of the point source. The middle frequency source of the spectrum lies at a greater distance from the center and the high frequency source at the greatest distance from the center, the distance being proportional to the spatial frequency and to the wavelength of the light. The pattern of these frequencies in the plane 39 is shown schematically in the form of a disc 42 immediately above plane 39. PLacing a spatial filter 43 in the plane 39 will modify the contrast and sharpness characteristics of the projected image in the image-receiving plane 41.

The spatial filter 43 can consist of an optically flat glass plate 44 on a central area 45 of which is coated a thin layer of light-attenuating material 46 which canbelight absorbing can be light or reflecting. The coated side of the plate 44 is cemented to a second optically flat glass plate 47 using a cement of the proper refractive index so that unwanted phase shifts are avoided. If this filter 43 absorbs light strongly in all areas except in the small central region where the zero-order image of the light source exists, the projected image in the plane 41 will be blurred and almost devoid of detail because only the very low frequency information and the average light level information will be transmitted by the filter. On the other hand, if the filter has high transmittance at all points except in a small central region where the transmittance can, for example, be about 40 percent, the projected image in plane 41 will have enhanced contrast in its fine details and at its edges and will have unchanged contrast only in its broad details; that is, the large uniform areas. The spatial filter 43a has high transmittance at all points except in an annular region 48. When such a filter is inserted in plane 39, the projected image in plane 41 shows reduction in contrast at the spatial frequencies corresponding to the radius of the light-absorbing annulus 48. Since the zero-order diffraction image is not reduced in intensity by this filter, the image in plane 41 shows no enhancement of contrast. FIlter 43b has an area 49 of progressively greater transmittance as the distance from its center increases. In this form of filter, the light-attenuating material in area 49 would gradually decrease from about 40–50 percent at the center to 0 and the extent or radius of gradation would be dependent on the degree of contrast required. This filter will produce a slight enhancement of contrast in low frequency or broad detail and a progressively greater enhancement in fine detail. The results obtained with the filter 43b are substantially the same as those attained with filter 43.

A preferred embodiment of the invention is disclosed in an optical system such as that set forth in FIG. 3A. In this embodiment, the system is particularly appropriate for modifying the projected image on an ordinary photographic film or transparency (black and white, color, negative or positive).

FIG. 3A discloses a plurality of small tungsten lamps 50 which are arranged symmetrically with respect to the optical axis of an optical system and with respect to a plurality of small apertures 51 symmetrically arranged in an opaque plate 52. Each of these lamps can be replaced by a laser or by any one of a variety of practical light sources. Thus a plurality of lasers 50a, as shown in FIG. 3B, can replace the plurality of tungsten lamps 50. Each of lamps 50 or 50a is placed at an angle relative to the optical axis, preferably not more than about 5°, to direct the light at an angle to the plate and at the same time permit the desired orientation of the lamps relative to the apertures 51. The apertures 51 and lamps 50 are positioned so that a maximum amount of light from each lamp will enter the condenser lens systems, comprising lenses 53 and 54, and be brought to focus in the focal plane 55 of the projection lens 56. As a result, the small spots of light in the aperture plane 52 are imaged in the plane 55 as small spots of light which are in the same configuration as the apertures 51 in plate 52. Each aperture 51 lies off the optical axis of the system by an angular amount that must be less than half the angle aperture of the objective lens 56. If a diffraction grating were placed in plane 57, that is, in the generally parallel light between the lenses 53 and 54, each of the spots of light in plane 55 would correspond to a zero-order image of the corresponding light source. Each zero-order image would be flanked on two sides by first, second, third and higher order diffracted images produced by the diffraction of light by the grating. The undiffracted and zero-order light would be collected by projection lens 56 and used to form an image in an image-receiving plane 58, the image being that of the grating. When such a grating is actually a photographic film 59 which can be a transparency (black and white, color, negative or positive), the positions of the four zero-order spots of light in plane 55 do not change but the intensity and spatial frequency of distribution diffracted light surrounding each zero-order does change. The film 59 is equivalent to a multiplicity of sine wave gratings having particular spatial frequencies, phases and orientations. If there are four light sources, there will be four essentially identical spatial spectra, each one displaced from the other by an amount indicated by the zero-order displacements, as shown in the disc 55' corresponding to plane 55. If white light is used instead of monochromatic light and, also, if a source having an angular diameter slightly greater than that of a theoretical point is used, each of the spatial spectra will be slightly blurred and fuzzy. However, despite the blurring, each of the four spatial spectra contains the low frequency, medium frequency and high frequency information concerning the image on the photographic film. The low frequency information lies near the zero-order spot, the medium frequency information lies at a greater distance, and the high frequency information at a still greater distance from the zero-order position. When extremely high spatial frequency information is present, some overlap will occur between the high frequency information in one spectrum and the medium and low frequency information in another spectrum. Such overlap is not detrimental, however, for the kind of spatial filtering generally desired in the normal photographic applications to which the invention is being applied.

The projection lens 56 uses the zero-order light (undiffracted) to produce uniform illumination in plane 58 indicated by dotted lines in FIG. 3A in which a screen or a photosensitive material, such as a photographic film, paper or plate, can be positioned. The diffracted light (spatial spectra) is used to construct in this same plane an image in accordance with the fine, medium and broad details of the image on the photographic film 59. Since all the pertinent information concerning the image on the film is conveniently spread out in space in plane 55, it is possible to introduce in plane 55 a spatial filter 60 that will absorb or reflect light in selected regions of each spectrum and thereby change the contrast and apparent sharpness of the image details in plane 58 in any of a variety of favorable ways. The preferred filters can ordinarilly produce no phase changes, but any desired phase change can be produced by the use of a special filter.

Spatial filter 60 comprises a first plate 61 of optically flat glass on four small areas 62 on which is coated a thin layer of light-absorbing or light-reflecting material. A cover glass 63 is cemented to the coated side of plate 61 to prevent unwanted phase shifts of the light. The intensity transmittance in the coated areas 62 of the filter can have any desired value and should be determined by the degree of filtering desired. An intensity transmittance of 50 percent, for example, is appropriate for many applications. When such a filter is inserted in plane 55 with the light attenuating areas in register with the undiffracted as well as the diffracted higher order light that carries the low frequency information, the original intensity of light in these areas is reduced about 50 percent. The result is an increase of approximately 25 percent in the contrast of the medium and fine details of the image in plane 58. A representation of this effect in terms of the modulation transfer function of the optical system is shown in the graph 64 which is associated with the spatial filter 60.

Spatial filter 60a is similar to filter 60 except that the light-attenuating areas 65 have a larger diameter. The effect of such a filter when placed in the aforementioned system is to increase the contrast of the fine details of the image in plane 58 with a small increase in the contrast of the medium details and no change in the contrast of the broad details. The corresponding modulation transfer curves 66 are shown to the right of the filter 60a. Filter 60b is provided with annular shaped light-attenuating areas 67 which will permit the zero-order light to be transmitted without reduction in intensity but reduces the intensity of the part of the diffracted light that carries the low frequency information and some of the medium frequency information. The projected image appearing in plane 58 then shows a reduction in contrast of the broad and medium details but no change in the contrast of the fine details. The modulation transfer curve for such a filter is designated by the numeral 68 and the graph is to the right of the disclosure showing filter 60b.

The lamps 50 shown in FIG. 3A need not be placed close to plate 52 whose apertures 51 define the angular size of the light source. Instead, the lamps can be placed farther back from the plate and the lamp filaments imaged on its respective aperture by means of auxiliary condenser lenses. Also, auxiliary lens systems, prisms and/or mirrors can, of course, be used to provide greater freedom in the placement of the lamps, as shown in FIG. 3B and 3E.

With respect to FIG. 3C, an arrangement is disclosed for providing a plurality of light sources in which the original sources designated by the numeral 80 are located at some distance from the rear condenser lens 81 of the condenser lens system 83 which also includes a front lens 82. The sources 80 can be arranged in any generally symmetrical configuration, each with respect to one end of a fiber glass element 84. The elements 84 can be of such a size that can be brought together in a plane relative to the condenser lens system 83 in such a way as to form a plurality of light sources generally equivalent to light emanating from an aperture in a plate such as that shown in FIG. 3A. The use of such internal light-reflecting elements will permit as many as thirty light sources to be used for producing an equivalent number of spatial spectra in a plane corresponding to the plane 55' shown in FIG. 3A with a photographic film 85 positioned between lenses 81 and 82 as described above with respect to FIG. 3A.

As shown in FIGS. 3D and 3E, zirconium concentrate arc lamps 90 can be used in place of tungsten lamps as used in FIG. 3A. Each of the arc lamps 90 can be arranged relative to an opaque plate 91 having a plurality of apertures 92 in which case the light emanating therefrom is incident on a photographic film 93 which is placed or positioned between the elements of a condenser lens system 94 only one lens 95 of which is shown. The remainder of the system can be the same as shown and described with respect to FIG. 3A. In FIG. 3E, the arc lamps 90 are displaced from the plate 91 by a greater distance and individual condenser lenses 96 image the light from each of the sources 90 on a respective one of the apertures 92.

The spatial filters described hereinabove with respect to the various embodiments of the invention can be made by methods well known in the prior art. For example, in one method, the filters can be produced photographically on fine grain photographic plates made with optically flat glass. In another method, grey or colored dye can be deposited on appropriate areas of a thin layer of gelatin coated on flat glass. By a third method, a thin layer of aluminum or other suitable metal can be evaporated on the appropriate areas of a glass plate. In connection with any one of these methods, a cover glass is preferably cemented to the filter-bearing surface of the cover glass to prevent the unwanted phase shifts that would otherwise occur in the transmitted light as a result of the different optical thickness in the various coated and uncoated areas forming the filter. The glass that is used must be "optically flat" and of an optical quality such as that normally required for a high quality lens. Techniques for producing wanted phase shifts in certain regions of the spatial filter are also well known and can be applied if deemed to be warranted.

In trial operation of the optical spatial filtering systems disclosed in FIGS. 3A–3E, it was found that image blemishes normally associated with the customary use of a point source for spatial filtering were reduced considerably. The effects of dust and other foreign matter on the optical elements, film base defects, bubbles in the lenses, "fringing" around photographic grain structure, "ringing" at edges and other related problems can be kept within very reasonable tolerance limits by a system such as that disclosed and described herein. The use of a very broad light source which might be described as a diffuse source would, of course, give a further reduction in these blemishes but such a source inherently gives low contrast in fine detail and does not permit spatial filtering of the type disclosed and described hereinabove.

The invention has been described in detail with particular reference to preferred embodiments thereof, but it will be understood that variations and modifications can be effected within the spirit and scope of the invention.

I claim:

1. An optical system for modifying the projected image of an image-bearing photographic transparency and defining an optic axis, comprising:

means for directing a plurality of light beams at said transparency, each of said light beams being displaced from said optic axis and having a luminous intensity substantially equal to that of a source of illumination and on passing through said transparency generating in a common image plane a discrete spatial spectrum of light comprising a zero-order and higher order spatial frequencies; and means arranged relative to said common image plane for projecting relative to said optic axis and on an image-receiving plane the light beams of zero-order spatial frequency as uniform illumination and the light beam of higher order spatial frequencies as fine, medium and broad details of said transparency image and for varying the luminous intensity of at least one of said zero and higher order spatial frequencies, thereby modifying at least one of the details of said projected image and enhancing the image contrast.

2. The system in accordance with claim 1 wherein said directing means is arranged relative to said transparency and includes a light source positioned with respect to each of a plurality of small apertures in an opaque plate for producing generally point sources of light and a condenser lens system for directing the light emanating from said point sources at said transparency.

3. The system in accordance with claim 2 wherein said point sources are formed by a tungsten filament lamp positioned relative to each of said apertures.

4. The system in accordance with claim 2 wherein said light source is generally coherent.

5. The system in accordance with claim 2 wherein said light source comprises a zirconium concentrated arc lamp that is partially coherent spatially and positioned relative to each of said apertures.

6. The system in accordance with claim 1 wherein said projecting means comprises a projection lens system with said common image plane generally near said projection lens system and spatial filtering means positioned in said common image plane.

7. The system in accordance with claim 6 wherein said spatial filtering means includes more than one light-attenuating area positioned in said common image plane so as to intercept at least the light beams of zero-order spatial frequency.

8. The system in accordance with claim 7 wherein said areas comprise a plurality of discrete light-attenuating areas in said common image plane, each of which is generally in registry with a respective one of the light beams of zero-order spatial frequency.

9. An optical system for modifying the projected image of an image-bearing photographic transparency, comprising:

means forming a plurality of light beams of substantially equal luminous intensity;

means for mounting said transparency relative to said light beams so as to intercept each of said light beams;

a condenser lens arranged in the path of said light beams and relative to said transparency, each of the light beams passing through said transparency generating a discrete spatial spectrum in a common image plane comprising a zero-order and higher order spatial frequencies;

a lens system arranged relative to said common image plane for projecting relative to a common optical axis and onto an image-receiving plane the light beams of zero-order spatial frequency as uniform illumination and the light beam of higher order spatial frequencies to produce said projected image comprising the fine, medium and broad details of said transparency image; and spatial filtering means arranged generally in said common image plane to intercept said spectra and having more than one light-attenuating area intercepting the light beams of zero-order spatial frequency for reducing the intensity thereby increasing the contrast of at least one of the fine and medium details relative to the broad details of said projected image.

10. The system in accordance with claim 9 wherein said forming means comprises a plurality of light sources, each of which is arranged relative to a respective small aperture in an opaque plate such that the light beam transmitted by each aperture is at least partially coherent spatially within its respective beams and generally incoherent with respect to every other light beam.

11. The system in accordance with claim 10 wherein the light emanating from each of said plurality of light sources is directed to said condenser lens system by a respective internal light transmitting medium.

12. The system in accordance with claim 9 wherein each of said light beams is formed by a tungsten filament lamp arranged at a small angle to the optical axis of said system and with respect to each of a plurality of apertures in an opaque plate.

13. The system in accordance with claim 9 wherein said spatial filtering means includes more than one light-attenuating area positioned in said common image plane so as to intercept at least the light beams of zero-order spatial frequency.

14. The system in accordance with claim 9 wherein said spatial filtering means includes an area of light-attenuating material positioned in said common image plane and in registry with a respective one of each light beam of zero-order spatial frequency.

15. The system in accordance with claim 9 wherein said attenuating area will absorb between about 40–60 percent of the light incident thereon.

16. The system in accordance with claim 9 wherein said spatial filtering means transmits the light beams of higher order spatial frequencies incident thereon and absorbs at least a portion of the light of zero-order spatial frequency.

* * * * *